(12) United States Patent
Rached

(10) Patent No.: US 11,512,877 B2
(45) Date of Patent: Nov. 29, 2022

(54) AIR CONDITIONING PROCESS

(71) Applicant: ARKEMA FRANCE, Colombes (FR)

(72) Inventor: Wissam Rached, Colombes (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 17/272,497

(22) PCT Filed: Aug. 26, 2019

(86) PCT No.: PCT/FR2019/051964
§ 371 (c)(1),
(2) Date: Mar. 1, 2021

(87) PCT Pub. No.: WO2020/049239
PCT Pub. Date: Mar. 12, 2020

(65) Prior Publication Data
US 2021/0318037 A1    Oct. 14, 2021

(30) Foreign Application Priority Data

Sep. 3, 2018  (FR) ...................................... 1857886

(51) Int. Cl.
| | | |
|---|---|---|
| F25B 5/00 | (2006.01) | |
| F25B 25/00 | (2006.01) | |
| C09K 5/04 | (2006.01) | |
| F25B 29/00 | (2006.01) | |

(52) U.S. Cl.
CPC ............ F25B 25/005 (2013.01); C09K 5/044 (2013.01); F25B 29/003 (2013.01);
(Continued)

(58) Field of Classification Search
CPC .... B60H 1/323; B60H 1/32281; F25B 25/005
See application file for complete search history.

(56) References Cited

U.S. PATENT DOCUMENTS 6,260,376 B1 * 7/2001 Khelifa .................. F25D 16/00
62/434
6,474,081 B1 * 11/2002 Feuerecker ............ B60H 1/323
62/99

(Continued)

FOREIGN PATENT DOCUMENTS

| CN | 103080668 A | 5/2013 |
|---|---|---|
| CN | 104114961 A | 10/2014 |

(Continued)

OTHER PUBLICATIONS

The First Office Action issued in CN Patent Application No. 201980054849.8, dated Mar. 15, 2022, China National Intellectual Property Administration, 13 pages (English-language translation only).

(Continued)

*Primary Examiner* — John R Hardee
(74) *Attorney, Agent, or Firm* — Buchanan Ingersoll & Rooney P.C.

(57) ABSTRACT

A process for conditioning air, by means of a main circuit, the main circuit being a vapor compression circuit, wherein a first refrigerant circulates, and a secondary circuit with no compressor, wherein a non-flammable second refrigerant including a hydrofluoroolefin and/or a hydrochlorofluoroolefin circulates, the main circuit and the secondary circuit being coupled to one another; the process including a heat exchange between the surroundings and the first refrigerant, a heat exchange between the first and second refrigerants, and a heat exchange between the second refrigerant and the air to be conditioned. Also, an air conditioning plant for implementing the process.

19 Claims, 1 Drawing Sheet

(52) U.S. Cl.
CPC .. *C09K 2205/122* (2013.01); *C09K 2205/126* (2013.01); *F25B 2400/121* (2013.01)

(56) References Cited

U.S. PATENT DOCUMENTS

| | | | | |
|---|---|---|---|---|
| 2009/0293525 | A1* | 12/2009 | Monforte | B60H 1/32281 62/498 |
| 2010/0252232 | A1 | 10/2010 | Reich et al. | |
| 2012/0085114 | A1* | 4/2012 | Graaf | B60H 1/323 62/238.7 |
| 2013/0133361 | A1 | 5/2013 | Yamashita et al. | |
| 2014/0069135 | A1* | 3/2014 | Mortreux | F25B 1/00 62/332 |
| 2014/0196483 | A1* | 7/2014 | Okazaki | F25B 25/005 62/126 |
| 2014/0374060 | A1 | 12/2014 | Labaste Mauhe et al. | |
| 2016/0318373 | A1 | 11/2016 | Kang et al. | |
| 2017/0191705 | A1 | 7/2017 | Sethi et al. | |
| 2017/0267066 | A1* | 9/2017 | Hong | B60H 1/32281 |
| 2020/0393155 | A1* | 12/2020 | Takata | F24F 11/81 |

FOREIGN PATENT DOCUMENTS

| | | |
|---|---|---|
| CN | 105682955 A | 6/2016 |
| EP | 1876398 A1 | 1/2008 |
| EP | 2341297 A1 | 7/2011 |
| EP | 3048387 A1 | 7/2016 |
| EP | 3279576 A1 | 2/2018 |
| EP | 3312527 A1 | 4/2018 |
| EP | 3318808 A1 | 5/2018 |
| JP | 2011127864 A | 6/2011 |
| WO | 2017099814 A1 | 6/2017 |
| WO | 2017143018 A1 | 8/2017 |
| WO | 2018005670 A1 | 1/2018 |

OTHER PUBLICATIONS

International Search Report (PCT/ISA/210) dated Dec. 12, 2019, by the European Patent Office as the International Searching Authority for International Application No. PCT/FR2019/051964.

Written Opinion (PCT/ISA/237) dated Dec. 12, 2019, by the European Patent Office as the International Searching Authority for International Application No. PCT/FR2019/051964.

Alam et al., "Measurement of Viscosity of cis-1,1,1,4,4,4-Hexafluoro-2-butene (R-1336mzz(z)) by Tandem Capillary Tubes Method," Journal of Chemical and Engineering Data, (May 10, 2018), vol. 63, No. 5, pp. 1706-1712.

Office Action (Communication pursuant to A94(3) Epc) dated Sep. 30, 2022, by the European Patent Office in corresponding European Patent Application No. 19 779 531.3-1016. (6 pages).

* cited by examiner

AIR CONDITIONING PROCESS

FIELD OF THE INVENTION

The present invention relates to a process for conditioning air by means of a vapor compression circuit in which circulates a first refrigerant fluid, coupled with a secondary circuit not having a compressor, in which circulates a nonflammable second refrigerant fluid. The invention also relates to a facility suitable for performing this process.

TECHNICAL BACKGROUND

The technology of heating and/or cooling of buildings is based on the use of a vapor compression circuit in which circulates a refrigerant fluid. More precisely, when it is a matter of air-conditioning (heating and cooling) the various rooms of a building, or of several buildings, the refrigerant fluid must circulate between a unit positioned outside the building and the various units positioned inside the building.

For example, EP 1876398, EP 3048387, EP 3279576, EP 3318808, EP 3312527 and WO 2018/005670 describe various stationary air-conditioning systems used for heating and/or cooling buildings.

R-410A is the fluid most commonly used in this type of system. R-410A is a refrigerant fluid consisting of 50% by weight of difluoromethane (HFC-32) and 50% by weight of pentafluoroethane (HFC-125). It has a low boiling point of −48.5° C., high energy efficiency, and is nonflammable and nontoxic. However, this heat-transfer fluid has a high global warming potential (GWP) (2100).

HFC-32 itself, having a GWP of 675, can hardly be used to replace R-410A as such. Specifically, HFC-32 is classed (according to the standard (ASHRAE 34) as a slightly flammable fluid, which poses safety problems when it is used in centralized systems and facilities as mentioned above. For example, the maximum load per circuit should be reduced in order to limit the circulation of the flammable fluid inside the building, which would result in a reduction in the performance of the system.

EP 2341297 describes an air-conditioning device comprising a circuit in which a refrigerant fluid circulates, this circuit being coupled with a secondary circuit in which water comprising antifreeze fluid is used as single-phase heat-transfer fluid.

This solution is, however, a constraint on the sizes of facilities, given that the consequence of using a single-phase fluid is a considerable increase in the pipework dimensions, higher pumping energy, and also a higher cost associated with the integration of this type of system into buildings.

WO 2017/099814 describes a device for obtaining water at high temperature, using heat recovered from a heat source and also using a refrigerant fluid (HCFO-1233zdE, HCFO-1233zdZ, HFO-1336mzzZ and HFO-1336mzzE being mentioned among others) which is capable of transferring heat from the heat source to the water.

There is thus a need to provide a method for air conditioning, notably for stationary heating and cooling, which is efficient and safe, while at the same time limiting the dimensions of the facility, the energy costs and the costs associated with the implementation of the method.

SUMMARY OF THE INVENTION

The invention relates firstly to a process for air conditioning, by means of a main circuit, the main circuit being a vapor compression circuit, in which circulates a first refrigerant fluid, and of a secondary circuit not comprising a compressor, in which circulates a nonflammable second refrigerant fluid comprising a hydrofluoroolefin and/or a hydrochlorofluoroolefin, the main circuit and the secondary circuit being coupled together; the process comprising heat exchange between the environment and the first refrigerant fluid, heat exchange between the first and the second refrigerant fluid, and heat exchange between the second refrigerant fluid and the air to be conditioned.

In certain embodiments, the first refrigerant fluid comprises a hydrofluoroolefin, a hydrochlorofluoroolefin, a hydrofluorocarbon, a hydrochlorofluorocarbon, and/or mixtures thereof; and preferably the first refrigerant fluid comprises 1,3,3,3-tetrafluoropropene, 2,3,3,3-tetrafluoropropene, difluoromethane, pentafluoroethane, 1,1,2,2-tetrafluoroethane, 1,1,1,2-tetrafluoroethane, 1,1-difluoroethane, fluoroethane, 1,1,1,2,3,3,3-heptafluoropropane, 1,1,1-trifluoropropane, trifluoroiodomethane, 1,1,2-trifluoroethylene and/or mixtures thereof.

In certain embodiments, the second refrigerant fluid comprises or consists of 1-chloro-3,3,3-trifluoropropene in cis and/or trans form, 1-chloro-2,3,3,3-tetrafluoropropene in cis and/or trans form, 1,1,1,4,4,4-hexafluoro-2-butene in cis and/or trans form, or a mixture thereof.

In certain embodiments, the second refrigerant fluid has a boiling point of less than 50° C. and preferably less than 40° C.

In certain embodiments, the process is a process for cooling and/or for heating air.

In certain embodiments, the process is a stationary air-conditioning process, preferably a process for conditioning the air of residential premises, of industrial premises and/or of commercial premises.

The invention also relates to an air-conditioning facility comprising:
- a main circuit, the main circuit being a vapor compression circuit, in which circulates a first refrigerant fluid, this main circuit including a heat exchanger for heat exchange between the first refrigerant fluid and the environment; and
- a secondary circuit not comprising a compressor, in which circulates a nonflammable second refrigerant fluid comprising a hydrofluoroolefin and/or a hydrochlorofluoroolefin, this secondary circuit including a heat exchanger for heat exchange between the second refrigerant fluid and the air to be conditioned;

the main circuit and the secondary circuit being coupled together via at least one heat exchanger.

In certain embodiments, the first refrigerant fluid comprises a hydrofluoroolefin, a hydrochlorofluoroolefin, a hydrofluorocarbon, a hydrochlorofluorocarbon, and/or mixtures thereof; and preferably the first refrigerant fluid comprises 1,3,3,3-tetrafluoropropene, 2,3,3,3-tetrafluoropropene, difluoromethane, chlorodifluoromethane, pentafluoroethane, 1,1,2,2-tetrafluoroethane, 1,1,1,2-tetrafluoroethane, 1,1-difluoroethane, fluoroethane, 1,1,1,2,3,3-heptafluoropropane, 1,1,1-trifluoropropane or mixtures thereof.

In certain embodiments, the second refrigerant fluid comprises 1-chloro-3,3,3-trifluoropropene in cis and/or trans form, 1-chloro-2,3,3,3-tetrafluoropropene in cis and/or trans form, 1,1,1,4,4,4-hexafluoro-2-butene in cis and/or trans form, or a mixture thereof.

In certain embodiments, the second refrigerant fluid has a boiling point of less than 50° C. and preferably less than 40° C.

In certain embodiments, the secondary circuit comprises at least one pump.

In certain embodiments, the facility is configured for cooling and/or heating air, and preferably configured for cooling and heating air, sequentially or optionally simultaneously.

In certain embodiments, the facility is configured for stationary air conditioning, preferably configured for conditioning the air of residential premises, of industrial premises and/or of commercial premises.

In certain embodiments, the facility is configured for conditioning the air of premises, in which the main circuit is positioned outside the premises, and the secondary circuit is positioned at least partly in the premises.

In certain embodiments, the facility comprises a heat exchanger in which the first refrigerant fluid and the second refrigerant fluid exchange heat to provide cooling of the air, and another heat exchanger in which the first refrigerant fluid and the second refrigerant fluid exchange heat to provide heating of the air.

The process of the invention as described above may be performed in the facility of the invention as described above. Reciprocally, the facility of the invention as described above may be configured for performing the process of the invention as described above.

The present invention makes it possible to meet the need expressed in the prior art. The invention more particularly provides a method for air conditioning, notably for stationary heating and cooling, which is efficient and safe, while at the same time limiting the dimensions of the facility, the energy costs and the costs associated with the implementation of the method.

This is accomplished by means of the use of a nonflammable refrigerant fluid comprising a hydrofluoroolefin and/or a hydrochlorofluoroolefin, in a secondary circuit, coupled with a vapor compression circuit comprising another refrigerant fluid, which may optionally be flammable. The invention enables the safe circulation of the nonflammable refrigerant fluid in any sensitive zone, for instance buildings, without limitation of the maximum load per circuit.

Furthermore, the nonflammable refrigerant liquid according to the invention preferably undergoes a phase change in the secondary circuit, more preferably at a temperature of less than 50° C. and at a pressure of 1 bar, which allows a large amount of heat to be transported while maintaining a relatively small pipework diameter and also a low flow rate. Thus, the energy consumed for the circulation of the refrigerant fluid is lower than that of a single-phase system.

Finally, in certain embodiments, the nonflammable refrigerant fluid according to the invention remains at a constant temperature in the exchangers, which makes it possible to reduce the temperature difference with the other refrigerant fluid and thus to increase the efficiency of the system.

DESCRIPTION OF EMBODIMENTS OF THE INVENTION

The invention is now described in greater detail and in a nonlimiting manner in the description that follows.

Figure 1:
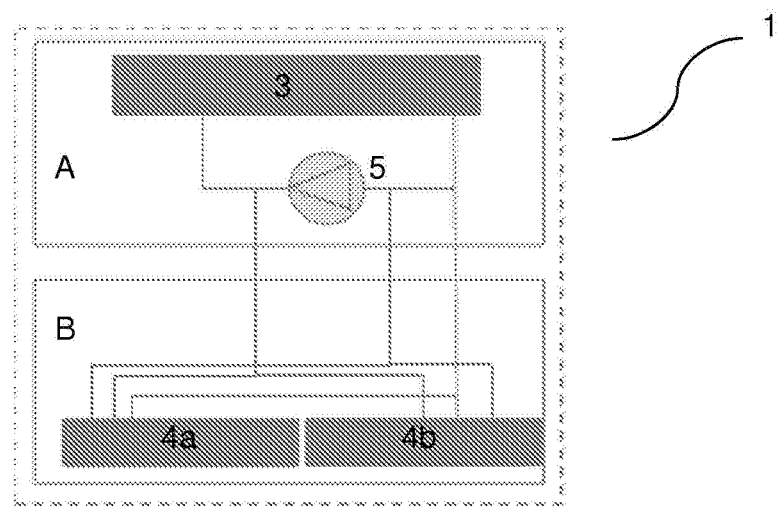
FIG. 1 schematically shows the main circuit according to one embodiment.
Figure 2:
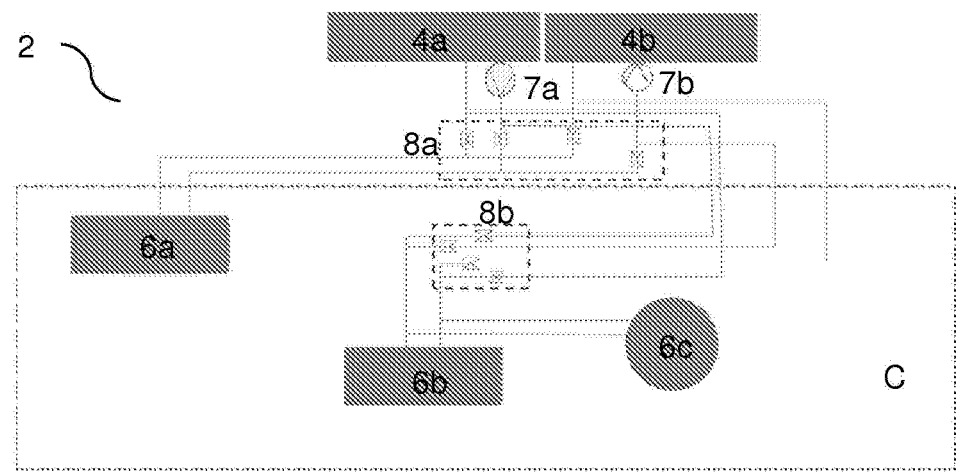
FIG. 2 schematically shows the secondary circuit which is coupled to the main circuit according to one embodiment.

The invention relates to an air-conditioning process performed using an air-conditioning facility. With reference to FIG. 1 and FIG. 2, the facility comprises a main circuit 1 which is a vapor compression circuit in which circulates a first refrigerant fluid, and a secondary circuit 2 in which circulates a nonflammable second refrigerant fluid, the main circuit 1 and the secondary circuit 2 being coupled together by means of at least one heat exchanger 4a, 4b.

The term "refrigerant fluid" means a fluid that is capable of absorbing heat by evaporating at low temperature and low pressure and of releasing heat by condensing at high temperature and high pressure, in a vapor compression circuit, according to the application under consideration. In general, a refrigerant fluid may consist essentially of a single heat-transfer compound or may be a mixture of several heat-transfer compounds.

The process according to the invention may be a stationary air-conditioning process. For example, the process according to the invention may be performed for conditioning the air of residential premises, industrial premises or commercial premises.

The term "air conditioning" means herein treatment of the air notably for controlling its temperature (and, where appropriate, its hygrometry). The air conditioning may notably comprise chilling of the air (referred to herein as cooling) and heating of the air.

The process according to the invention may thus be a cooling process.

Alternatively, the process according to the invention may be a heating process.

Alternatively, the process according to the invention may be a process in which one or more cooling phases alternate with one or more heating phases.

Alternatively and advantageously, the process according to the invention may be a process which simultaneously provides heating and cooling, for example in distinct premises or parts of distinct premises.

Thus, this process is particularly useful when different rooms and/or different premises have different air conditioning needs.

Main Circuit

The main circuit 1 or vapor compression circuit includes a refrigerating loop, which is preferably reversible, in which circulates the first refrigerant fluid.

The main circuit 1 functions according to a conventional vapor compression cycle. The cycle comprises the change of state of the refrigerant fluid from a liquid phase (or liquid/vapor dual phase) to a vapor phase at a relatively low pressure, then the compression of the refrigerant fluid in vapor phase upto a relatively high pressure, the change of state (condensation) of the refrigerant fluid from the vapor phase to the liquid phase at a relatively high pressure, and the reduction of the pressure to recommence the cycle.

The main circuit 1 may thus comprise a first heat exchanger 3, at least one second heat exchanger 4a, 4b, a compressor 5, an expansion valve (not shown in the figure) and also means for inverting the functioning of the reversible refrigerating loop. The main circuit 1 may also comprise pipes, tubes, hoses, tanks or the like, in which circulates the first refrigerant fluid, between the various exchangers, expansion valves, other valves, etc.

The first heat exchanger 3 enables heat exchange between the first refrigerant fluid and the environment, that is to say in general the external air. This heat exchange may be direct or indirect (via a heat-transfer fluid). It is preferably direct.

Thus, both external air and the first refrigerant fluid preferably pass through the first heat exchanger 3. By virtue of the means for inverting the functioning of the reversible refrigerating loop, the first heat exchanger 3 can act as a condenser in a cooling mode or act as an evaporator in a heating mode.

At least one second heat exchanger 4a, 4b enables heat exchange between the first refrigerant fluid and the second refrigerant fluid which circulates in the secondary circuit 2. Thus, both the first refrigerant fluid and the second refrigerant fluid pass through the second heat exchanger 4a, 4b. It is thus also considered as forming part of the secondary circuit 2. The second heat exchanger 4a, 4b can act as a condenser or as an evaporator for the first refrigerant fluid.

Preferably, the main circuit 1 includes at least one second heat exchanger 4a for cooling air, and at least one second heat exchanger 4b for heating air, which are as described above. This enables the facility to provide cooling and heating functions, where appropriate simultaneously. The second heat exchanger 4a for cooling acts as an evaporator with respect to the first refrigerant fluid, and the second heat exchanger 4b for heating acts as a condenser with respect to the first refrigerant fluid. In this case, the secondary circuit 2 preferably includes two separate subcircuits, one comprising the second heat exchanger 4a for cooling and the other comprising the second heat exchanger 4b for heating.

It is possible to use any type of heat exchanger in the invention, and notably cocurrent heat exchangers or, preferably, countercurrent heat exchangers.

The term "countercurrent heat exchanger" means a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers comprise devices in which the flow of the first fluid and the flow of the second fluid are in opposite directions or virtually opposite directions. Exchangers operating in crosscurrent mode with a countercurrent tendency are also included among the countercurrent heat exchangers.

In certain embodiments, the means for inverting the functioning of the reversible refrigerating loop of the main circuit 1 are means for inverting the functioning of the refrigerating loop between a position in cooling mode and a position in heating mode.

The abovementioned inversion means may be means for modifying the course of the first refrigerant fluid in the reversible refrigerating loop, or means for inverting the direction of circulation of the first refrigerant fluid in said loop.

The abovementioned inversion means may be a four-way valve, a switchover valve, a shut-off (on/off) valve, an expansion valve, or combinations thereof.

The compressor 5 may be hermetic, semihermetic or open. Hermetic compressors comprise a motor part and a compression part, which are contained within an undismantleable hermetic enclosure. Semihermetic compressors comprise a motor part and a compression part, which are directly assembled together. The coupling between the motor part and the compression part is accessible by detaching the two parts by dismantling. Open compressors comprise a motor part and a compression part which are separate. They may operate by belt drive or by direct coupling.

The compressor used may notably be a dynamic compressor, or a positive displacement compressor.

Dynamic compressors comprise axial compressors and centrifugal compressors, which may have one or more stages. Centrifugal mini-compressors may also be employed.

Positive displacement compressors comprise rotary compressors and reciprocating compressors.

Reciprocating compressors comprise diaphragm compressors and piston compressors.

Rotary compressors comprise screw compressors, lobe compressors, scroll (or spiral) compressors, liquid ring compressors, and vane compressors. Screw compressors may preferably be twin-screw or single-screw.

The compressor may comprise a device for injecting vapor or liquid. Injection consists in introducing the refrigerant, in the liquid or vapor state, into the compressor at an intermediate level between the start and the end of compression.

The compressor may be driven by an electric motor or by a gas turbine or by gears.

When the air conditioning facility is intended for conditioning the air of one or more buildings, the main circuit 1 may be positioned entirely outside the building(s). Alternatively, the main circuit 1 may be positioned inside a building, in a location such as a room (different from the location in which the air is conditioned) comprising ventilation means. Alternatively also, a first part (comprising the compressor 5 and the first heat exchanger 3) of the main circuit 1 may be positioned outside the building(s), whereas a second part (comprising the second heat exchangers 4a, 4b) may be positioned in a location such as a room (different from the location in which the air is conditioned) comprising ventilation means.

The first refrigerant fluid circulating in the main circuit 1 may comprise one or more heat-transfer compounds chosen from a hydrofluoroolefin, a hydrochlorofluoroolefin, a hydrofluorocarbon, a hydrochlorofluorocarbon, and combinations thereof. Among the hydrofluoroolefins, mention may notably be made of 1,3,3,3-tetrafluoropropene (HFO-1234ze) in cis and/or trans form and preferably in trans form, and 2,3,3,3-tetrafluoropropene (HFO-1234yf). Among the hydrofluorocarbons, mention may notably be made of difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1-trifluoropropane (HFC-263fb), trifluoroiodomethane and 1,1,2-trifluoroethylene (HFO-1123).

The first refrigerant fluid consists essentially of, or even consists of, one or more heat-transfer compounds.

In certain embodiments, the first refrigerant fluid consists of or consists essentially of HFC-32, R-459A (68% HFC-32, 26% HFO-1234yf, 6% HFO-1234zeE), R-454B (68.9% HFC-32, 31.1% HFO-1234yf), R-454A (35% HFC-32, 65% HFO-1234yf), R-452B (67% HFC-32, 7% HFC-125, 26% HFO-1234yf) R-463A (6% $CO_2$ or R-744, 36% HFC-32, 30% HFC-125, 14% HFC-134a, 14% HFO-1234yf), R-513A (56% HFO-1234yf, 44% HFC-134a), R-446A (68% HFC-32, 29% HFO-1234zeE, 3% n-butane or R-600) R-447A (68% HFC-32, 8% HFC-125, 24% HFO-1234zeE), R-447B (68% HFC-32, 3.5% HFC-125, 28.5% HFO-1234zeE), AMOLEA 460X (68% HFC-32, 32% HFO-1123), AMOLEA 400X (60% HFC-32, 40% HFO-1123), AMOLEA 370X (55% HFC-32, 45% HFO-1123), AMOLEA 300X (40% HFC-32, 60% HFO-1123), HFO-1234yf or HFO-1234ze and also combinations thereof.

In certain embodiments, the first refrigerant fluid is associated, in the main circuit 1, with lubricants and/or additives—to form a first heat-transfer composition.

The additives that may be present in combination with the first refrigerant fluid may notably be chosen from nanoparticles, stabilizers, surfactants, tracer agents, fluorescent agents, odorants and solubilizers.

The total amount of additives preferably does not exceed 5% by weight, in particular 4%, more particularly 3%, and most particularly 2% by weight, or even 1% by weight of the first refrigerant fluid.

In certain embodiments, the first refrigerant fluid contains impurities. When they are present, they may represent less than 1%, preferably less than 0.5%, preferably less than 0.1%, preferably less than 0.05% and preferably less than 0.01% (by weight) relative to the first refrigerant fluid.

One or more lubricants may be present in combination with the first refrigerant fluid. These lubricants may be chosen from polyol esters (POE), polyalkylene glycols (PAG) or polyvinyl ethers (PVE).

The lubricants may represent from 0 to 60%, preferably from 1% to 40% and more preferably from 2% to 30% (by weight) relative to the first refrigerant fluid.

Preferably, the first refrigerant fluid in the main circuit 1 contains one or more flammable heat-transfer compounds; or this first refrigerant fluid is itself flammable.

The "flammable" nature of a fluid is assessed under the terms of the standard ASHRAE 34-2007, with a test temperature of 60° C. instead of 100° C.

Secondary Circuit

The secondary circuit 2, in which circulates the second refrigerant fluid, does not contain a compressor.

The secondary circuit 2 may comprise one or more heat exchangers referred to herein as additional heat exchangers 6a, 6b, 6c, which enable heat exchange between the second refrigerant fluid and the air that is conditioned. This heat exchange may be direct or indirect (via a heat-transfer fluid). It is preferably direct.

Thus, both the second refrigerant fluid and the air that is conditioned preferably pass through the additional heat exchangers 6a, 6b, 6c. The additional heat exchangers 6a, 6b, 6c may act as condensers or as evaporators, for the second refrigerant fluid, depending on whether the air is heated or, respectively, cooled. For example, if the process according to the invention is used for conditioning the air of different rooms of a building, the number of additional heat exchangers 6a, 6b, 6c is preferably at least equal to the number of rooms whose air is conditioned.

The heat exchangers are preferably as described above in relation with the main circuit 1.

The secondary circuit 2 is provided with pipes, tubes or the like, which connect the second heat exchanger(s) 4a, 4b with the additional heat exchanger(s) 6a, 6b, 6c of the secondary circuit 2.

The secondary circuit 2 preferably comprises at least one pump 7a to force the circulation of the second refrigerant fluid in the secondary circuit 2, between the at least one second heat exchanger 4a of the main circuit 1 and the additional heat exchanger(s) 6a, 6b, 6c of the secondary circuit 2.

When the facility according to the invention comprises at least one second heat exchanger 4a for cooling and at least one second heat exchanger 4b for heating, the secondary circuit 2 may comprise a pump 7a associated with the second heat exchanger 4a for cooling (which is preferably configured to pump the second refrigerant fluid from the second heat exchanger 4a to the additional heat exchangers 6a, 6b, 6c), and another pump 7b associated with the second heat exchanger 4b for heating (which is preferably configured to pump the second refrigerant fluid from the additional heat exchangers 6a, 6b, 6c to the second heat exchanger 4b).

When the air conditioning facility is intended for conditioning the air of one or more buildings, the secondary circuit 2 may be located totally or partly, and preferably partly, inside the building(s) C. As described above, the second exchanger(s) 4a, 4b may be located outside the building(s) C, as illustrated in FIG. 2. Alternatively, the second exchanger(s) 4a, 4b may be positioned in a location such as a room (different from the location in which the air is conditioned) comprising ventilation means.

The second refrigerant fluid circulating in the secondary circuit 2 may comprise one or more heat-transfer compounds chosen from a hydrofluoroolefin, a hydrochlorofluoroolefin, and combinations thereof. Among the hydrofluoroolefins, mention may notably be made of 1,1,1,4,4,4-hexafluoro-2-butene (HFO-1336mzz) in cis or trans form. Among the hydrochlorofluoroolefins, mention may notably be made of 1-chloro-3,3,3-trifluoropropene (HCFO-1233zd) in cis or trans form and 1-chloro-2,3,3,3-tetrafluoropropene (HCFO-1224yd) in cis or trans form. Preferably, HCFO-1233zd and HCFO-1224yd are in trans form.

The second refrigerant fluid may thus consist (or consist essentially) of HFO-1336mzz in cis form. The second refrigerant fluid may consist (or consist essentially) of HFO-1336mzz in trans form. The second refrigerant fluid may consist (or consist essentially) of a mixture of HFO-1336mzz in cis and trans form.

The second refrigerant fluid may also consist (or consist essentially) of HCFO-1233zd in cis form. The second refrigerant fluid may consist (or consist essentially) of HCFO-1233zd in trans form. The second refrigerant fluid may consist (or consist essentially) of a mixture of HCFO-1233zd in cis and trans form.

The second refrigerant fluid may also consist (or consist essentially) of HCFO-1224yd in cis form. The second refrigerant fluid may consist (or consist essentially) of HCFO-1224yd in trans form. The second refrigerant fluid may consist (or consist essentially) of a mixture of HCFO-1224yd in cis and trans form.

In other embodiments, the second refrigerant fluid is a mixture, which may include one or more of the following compounds: HCFO-1233zdE, HFO-1336mzzZ, HFO-1336mzzE, HCFO-1224yd.

The second refrigerant fluid consists essentially of, or even consists of, one or more heat-transfer compounds.

In certain embodiments, the second refrigerant fluid is associated, in the secondary circuit 2, with lubricants and/or additives—to form a second heat-transfer composition.

The additives that may be present in combination with the second refrigerant fluid may notably be chosen from nanoparticles, stabilizers, surfactants, tracer agents, fluorescent agents, odorants, and solubilizers.

The total amount of additives preferably does not exceed 5% by weight, in particular 4%, more particularly 3%, and most particularly 2% by weight, or even 1% by weight of the second refrigerant fluid.

In certain embodiments, the second refrigerant fluid contains impurities. When they are present, they may represent less than 1%, preferably less than 0.5%, preferably less than 0.1%, preferably less than 0.05% and preferably less than 0.01% (by weight) relative to the second refrigerant fluid.

Preferably, the second refrigerant fluid circulating in the secondary circuit 2 does not contain any flammable heat-transfer compounds, or at the very least it is nonflammable per se.

The "nonflammable" nature of a fluid is assessed under the terms of the standard ASHRAE 34-2007, with a test temperature of 60° C. instead of 100° C.

In certain embodiments, the second refrigerant fluid has a GWP of less than or equal to 1100; or less than or equal to 1000; or less than or equal to 900; or less than or equal to 800; or less than or equal to 700; or less than or equal to 600; or less than or equal to 500; or less than or equal to 400; or less than or equal to 300; or less than or equal to 200; or less than or equal to 150; or less than or equal to 100; or less than or equal to 50.

In certain embodiments, the second refrigerant fluid may have a boiling point of less than 50° C. and preferably less than 40° C. Thus, the boiling point of the second refrigerant fluid may notably be from 0 to 5° C.; or from 5 to 10° C.; or from 10 to 15° C.; or from 15 to 20° C.; or from 20 to 25° C.; or from 25 to 30° C.; or from 30 to 35° C.; or from 35 to 40° C.; or from 40 to 45° C.; or from 45 to 50° C.

The facility according to the invention may also comprise one or more branch boxes 8a, 8b for controlling the supply of the additional heat exchangers 6a, 6b, 6c individually. Certain additional heat exchangers 6a, 6b, 6c may, however, be coupled and thus supplied in conjunction, as illustrated.

More precisely, this or these branch box(es) 8a, 8b may be positioned inside or outside the building(s) C whose air is conditioned, and they may include a series of valves capable of controlling the supply of the secondary circuit 2, i.e. of supplying the various additional heat exchangers 6a, 6b, 6c with the second refrigerant fluid.

Air-Conditioning Process

The vapor compression system of the main circuit 1 preferably functions according to a conventional vapor compression cycle. The cycle comprises the change of state of the first refrigerant fluid from a liquid phase (or liquid/vapor dual phase) to a vapor phase at a relatively low pressure, then the compression of the fluid in vapor phase upto a relatively high pressure, the change of state (condensation) of the heat transfer fluid from the vapor phase to the liquid phase at a relatively high pressure, and the reduction of the pressure to recommence the cycle.

In the secondary circuit 2, the second refrigerant fluid also preferably changes state in the respective heat exchangers, from the vapor phase (or a dual state) to the liquid phase (or a dual state), and from the liquid phase (or a dual state) to the vapor phase (or a dual state). However, the second refrigerant fluid does not undergo any compression or any expansion. It is simply pumped so as to overcome the pressure losses of the circuit and to enable its circulation.

Still with reference to FIG. 1 and FIG. 2, in cooling mode, the first refrigerant fluid leaving the compressor 5 in gas form is directed toward the first heat exchanger 3 which acts in this case as a condenser, enabling heat transfer from the first refrigerant fluid to the environment (typically the external air). This results in the condensation of the first refrigerant fluid. Thereafter, the first refrigerant fluid passes through an expansion valve (not shown in the figure) and is directed toward a second heat exchanger 4a which acts as the evaporator for the first refrigerant fluid (and as the condenser for the second refrigerant fluid). Heat is thus transferred from the second refrigerant fluid to the first refrigerant fluid. The first refrigerant fluid is then directed toward the compressor 5 to recommence the refrigeration cycle. The second refrigerant fluid is, for its part, directed, by means of the pump 7a of the secondary circuit 2, toward one or more additional heat exchangers 6a, 6b, 6c. The additional heat exchanger(s) 6a, 6b, 6c act here as evaporators for transferring heat from the air which is to be conditioned to the second refrigerant fluid. This results in the evaporation of the second refrigerant fluid and the cooling of the air to be conditioned. The second refrigerant fluid is then directed toward the second heat exchanger 4a to recommence the cycle.

In heating mode, the first refrigerant fluid, which is in liquid phase or dual phase, is directed toward the first heat exchanger 3 which acts in this case as the evaporator and which transfers heat from the environment (typically the external air) to the first refrigerant fluid. This results in the evaporation of the first refrigerant fluid. Thereafter, the first refrigerant fluid passes through the compressor 5 and is directed toward a second heat exchanger 4b which acts as the condenser for the first refrigerant fluid (and as the evaporator for the second refrigerant fluid). Heat is thus transferred from the first refrigerant fluid to the second refrigerant fluid. The first refrigerant fluid then passes through the expansion valve and is directed toward the first heat exchanger 3 to recommence the cycle. The second refrigerant fluid is, for its part, directed toward one or more additional heat exchangers 6a, 6b, 6c. The additional heat exchanger(s) 6a, 6b, 6c act here as condensers for transferring heat from the second refrigerant fluid to the air which is to be conditioned. This results in the condensation of the second refrigerant fluid and the heating of the air to be conditioned. The second refrigerant fluid is then directed, by means of the pump 7b, toward the second heat exchanger 4b to recommence the cycle.

In particular, when heating and cooling are performed simultaneously, it is possible to envisage energy recovery, for example by means of direct transfer of heat from one part of the secondary circuit 2 to another part of the secondary circuit 2 by simple circulation of the second refrigerant fluid.

EXAMPLE

The example that follows illustrates the invention without limiting it. This example is directed toward comparing the necessary flow rate of second refrigerant fluid when the facility according to the invention is used for cooling a building to 10° C. with a power of 1 kW. The temperature of the conditioned air is 15° C.

Water, HFO-1233zdE and HFO-1336mzzE are used as refrigerant fluids circulating in the heat exchangers of a facility according to the invention, and are compared with R410A in a conventional facility. The results are presented in the two tables below, in which the temperatures at the inlet and outlet of the evaporators are indicated, as is the energy per unit mass delivered by the system.

| Product | Inlet temperature (° C.) | Outlet temperature (° C.) | Energy (kJ/kg) | Flow rate (kg/h) |
|---|---|---|---|---|
| Water | 5 | 10 | 21 | 171 |
| HFO-1233zdE | 10 | 10 | 200 | 18 |
| HFO-1336mzzE | 10 | 10 | 147 | 25 |
| R-410A | 10 | 10 | 208 | 17 |

These results of the first table indicate that the use of a refrigerant fluid according to the invention such as HFO-1233zdE and HFO-1336mzzE makes it possible to apply a lower flow rate than that which should be applied when water is used as heat-transfer fluid. The result of this is to reduce the vibration and noise problems. This flow rate is equivalent to the flow rate obtained with the reference product (R410A).

| Product | Liquid density | Pressure (bar) | Fluid speed (m/s) | Pipe diameter (mm) | % variation in the diameter |
|---|---|---|---|---|---|
| Water | 1000 | — | 2 | 5.5 | 330 |
| HFO-1233zdE | 1300 | 0.73 | 2 | 1.6 | 0 |
| HFO-1336mzzE | 1525 | 1.15 | 2 | 1.6 | 0 |
| R-410A | 1128 | 11 | 2 | 1.6 | 0 |

These results of the second table indicate that the use of a refrigerant fluid according to the invention such as HFO-1233zdE and HFO-1336mzzE makes it possible to use pipes of smaller diameter than that of the pipes used when water is used as refrigerant fluid in order to deliver the same power. These diameters are the same as those used with the reference product R410A. Furthermore, the refrigerant fluids according to the invention have a pressure below the pressure of R-410A, which makes it possible to reduce the risks of leakages.

The invention claimed is:

1. A process for air conditioning, by means of a main circuit, the main circuit being a vapor compression circuit, in which circulates a first refrigerant fluid, and of a secondary circuit not comprising a compressor, in which circulates a nonflammable second refrigerant fluid comprising 1,1,1,4,4,4-hexafluoro-2-butene in cis and/or trans form, the main circuit and the secondary circuit being coupled together;
  the process comprising heat exchange between the environment and the first refrigerant fluid, heat exchange between the first and the second refrigerant fluid, and heat exchange between the second refrigerant fluid and the air to be conditioned.

2. The process as claimed in claim 1, in which the first refrigerant fluid comprises a hydrofluoroolefin, a hydrochlorofluoroolefin, a hydrofluorocarbon, a hydrochlorofluorocarbon, and/or mixtures thereof.

3. The process as claimed in claim 1, in which the second refrigerant fluid consists of 1,1,1,4,4,4-hexafluoro-2-butene in cis and/or trans form.

4. The process as claimed in claim 1, in which the second refrigerant fluid has a boiling point of less than 50° C.

5. The process as claimed in claim 1, which is a process for cooling and/or for heating air.

6. The process as claimed in claim 1, which is a stationary air-conditioning process.

7. The process as claimed in claim 1, in which the first refrigerant fluid comprises 1,3,3,3-tetrafluoropropene, 2,3,3,3-tetrafluoropropene, difluoromethane, pentafluoroethane, 1,1,2,2-tetrafluoroethane, 1,1,1,2-tetrafluoroethane, 1,1-difluoroethane, fluoroethane, 1,1,1,2,3,3,3-heptafluoropropane, 1,1,1-trifluoropropane, trifluoroiodomethane, trifluoroethylene, or mixtures thereof.

8. The process as claimed in claim 1, in which the first refrigerant fluid comprises pentafluoroethane, 1,1,2,2-tetrafluoroethane, 1,1,1,2-tetrafluoroethane, 1,1-difluoroethane, fluoroethane, 1,1,1,2,3,3,3-heptafluoropropane, 1,1,1-trifluoropropane, trifluoroiodomethane, 1,1,2-trifluoroethylene, or mixtures thereof.

9. An air-conditioning facility comprising:
  a main circuit, the main circuit being a vapor compression circuit, in which circulates a first refrigerant fluid, this main circuit including a heat exchanger for heat exchange between the first refrigerant fluid and the environment; and
  a secondary circuit not comprising a compressor, in which circulates a nonflammable second refrigerant fluid comprising 1,1,1,4,4,4-hexafluoro-2-butene in cis and/or trans form, this secondary circuit including a heat exchanger for heat exchange between the second refrigerant fluid and the air to be conditioned;
  the main circuit and the secondary circuit being coupled together via at least one heat exchanger.

10. The facility as claimed in claim 9, in which the first refrigerant fluid comprises a hydrofluoroolefin, a hydrochlorofluoroolefin, a hydrofluorocarbon, a hydrochlorofluorocarbon, and/or mixtures thereof.

11. The facility as claimed in claim 9, in which the second refrigerant fluid consists of 1,1,1,4,4,4-hexafluoro-2-butene in cis and/or trans form.

12. The facility as claimed in claim 9, in which the second refrigerant fluid has a boiling point of less than 50° C.

13. The facility as claimed in claim 9, in which the secondary circuit comprises at least one pump.

14. The facility as claimed in claim 9, which is configured for cooling and/or heating air.

15. The facility as claimed in claim 9, which is configured for stationary air-conditioning.

16. The facility as claimed in claim 9, which is configured for conditioning the air of premises, in which the main circuit is positioned outside the premises, and the secondary circuit is positioned at least partly in the premises.

17. The facility as claimed in claim 9, comprising a heat exchanger in which the first refrigerant fluid and the second refrigerant fluid exchange heat to provide cooling of the air, and another heat exchanger in which the first refrigerant fluid and the second refrigerant fluid exchange heat to provide heating of the air.

18. The facility as claimed in claim 9, in which the first refrigerant fluid comprises 1,3,3,3-tetrafluoropropene, 2,3,3,3-tetrafluoropropene, difluoromethane, chlorodifluoromethane, pentafluoroethane, 1,1,2,2-tetrafluoroethane, 1,1,1,2-tetrafluoroethane, 1,1-difluoroethane, fluoroethane, 1,1,1,2,3,3,3-heptafluoropropane, 1,1,1-trifluoropropane or mixtures thereof.

19. The facility as claimed in claim 9, in which the first refrigerant fluid comprises pentafluoroethane, 1,1,2,2-tetrafluoroethane, 1,1,1,2-tetrafluoroethane, 1,1-difluoroethane, fluoroethane, 1,1,1,2,3,3,3-heptafluoropropane, 1,1,1-trifluoropropane, trifluoroiodomethane, 1,1,2-trifluoroethylene, or mixtures thereof.

* * * * *